United States Patent [19]
Podd, Jr. et al.

[11] Patent Number: 5,482,425
[45] Date of Patent: Jan. 9, 1996

[54] CONVEYOR SHEET CARGO CONTAINER AND METHOD

[76] Inventors: Victor I. Podd, Jr., 1678 SW. 20th Ave., Boca Raton, Fla. 33486; Stephen D. Podd, One Lincoln Blvd., Rouses Point, N.Y. 12979

[21] Appl. No.: 367,676

[22] Filed: Dec. 30, 1994

Related U.S. Application Data

[63] Continuation of Ser. No. 954,346, Sep. 30, 1992, abandoned, which is a continuation-in-part of Ser. No. 732,451, Jul. 18, 1991, abandoned.

[51] Int. Cl.⁶ .................................................. B60P 1/38
[52] U.S. Cl. .................... 414/527; 242/597; 410/142; 410/129; 298/1 B; 414/501; 220/729; 220/403
[58] Field of Search ............................. 414/527, 539, 414/528, 501, 786, 489, 579; 298/1 B; 220/729, 403; 410/129, 140, 121–128, 140–152, 130–139; 242/613, 610.1, 597

[56] References Cited

U.S. PATENT DOCUMENTS

| | | | |
|---|---|---|---|
| 2,477,707 | 8/1949 | Walz | 414/527 |
| 2,595,395 | 5/1952 | Lavelle et al. | 414/527 |
| 2,764,304 | 9/1956 | Johnson, Jr. | 414/527 X |
| 3,427,997 | 1/1969 | Brown et al. | 105/369 |
| 3,696,952 | 10/1972 | Bodenheimer | |
| 3,704,798 | 12/1972 | Carpenture, Jr. et al. | 414/527 |
| 4,194,702 | 3/1980 | Ploeg | 242/86.5 R |
| 4,390,141 | 6/1983 | Webster | 242/86.5 R |
| 4,494,896 | 1/1985 | Di Franco | 410/142 X |
| 4,629,390 | 12/1986 | Burke | 414/527 |
| 4,705,283 | 11/1987 | Kleisath | 242/86.5 R X |
| 4,784,287 | 11/1988 | Yamada et al. | 220/403 |
| 4,892,456 | 1/1990 | Hodgetts | 414/527 |
| 5,244,332 | 9/1993 | Krein et al. | 414/467 |

FOREIGN PATENT DOCUMENTS 1205106  5/1986  Canada.

*Primary Examiner*—Frank E. Werner
*Attorney, Agent, or Firm*—Randall L. Reed

[57] ABSTRACT

An unloading apparatus for use with a cargo container. The unloading apparatus having a supporting frame with a mandrel rotatably supported by the supporting frame and laterally extending across the frame. The unloading apparatus having devices to detachably connect it to the rear of the container. A liner disposed on the floor of the container with devices to connect the liner to the unloading apparatus when the unloading apparatus is connected to the back of the container. The liner in some uses has rolled or pleated sections which unfold or unroll as the liner is pulled out of the container and winds onto the mandrel. As the liner winds onto the mandrel, the cargo contained on top of the liner falls out the back and into a collection device such as a bin located at the rear of the container.

20 Claims, 9 Drawing Sheets

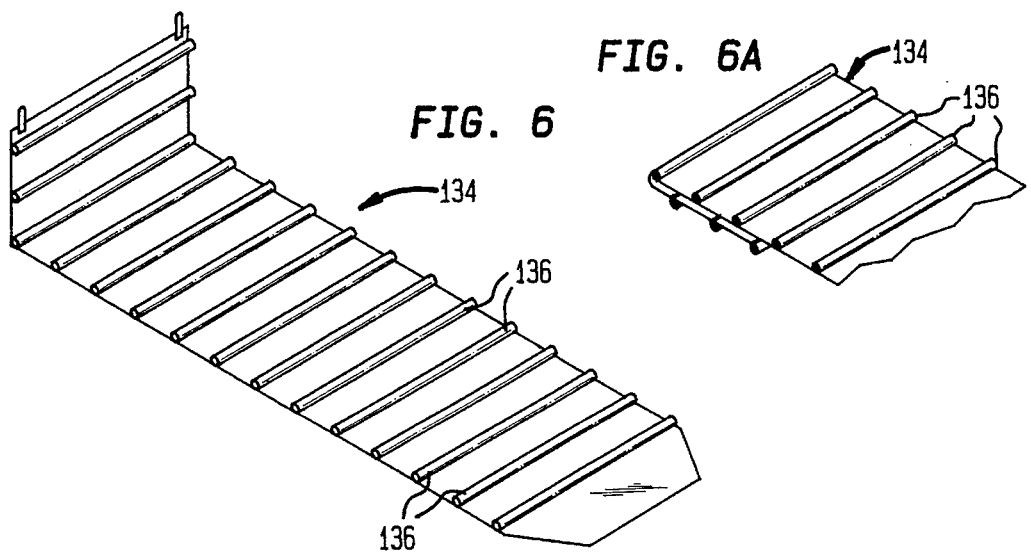
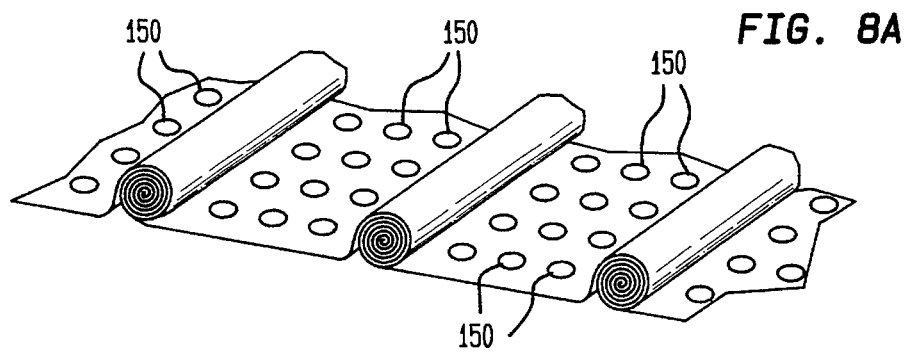
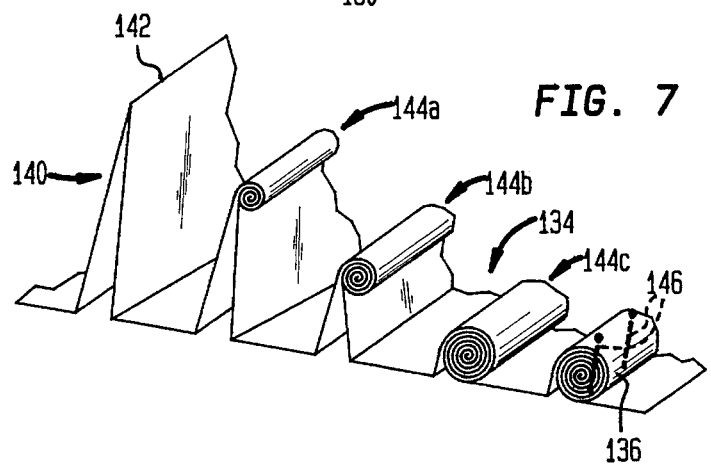
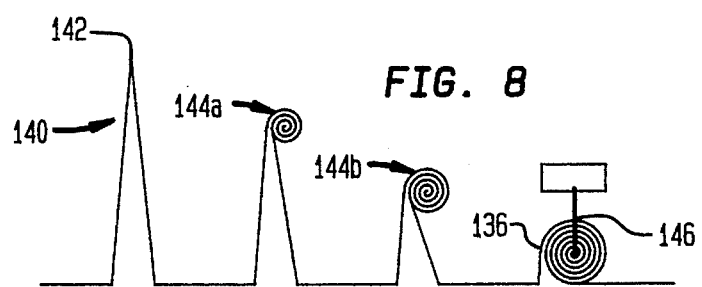

CONVEYOR SHEET CARGO CONTAINER AND METHOD

This application is a continuation of Ser. No. 07/954,346 filed Sep. 30, 1992, now abandoned which is a continuation-in-part of pending application Ser. No. 732,451, filed Jul. 18, 1991, now abandoned.

BACKGROUND OF THE INVENTION

This invention generally relates to cargo containers; and more specifically, to cargo containers of the type from which bulk cargo is discharged by pulling a bottom or floor liner out from the container.

Standardized containers-or boxes have come into very extensive use for the shipment of freight by land and sea, and the many advantages of such intermodal containers have made it very desirable to adapt them for use with as many types of cargo as possible. Accordingly, there have been attempts, with varying degrees of success, to use such standardized containers to carry bulk cargo such as dry bulk chemicals, powdered and pelletized resins, flour, coffee beans, and grains. In particular, considerable attention has been given over the last several years to transporting such cargo in bulk in standardized intermodal cargo containers—that is, in containers in which the cargo is loaded directly into the intermodal containers, without first being loaded or packed into smaller boxes or packages that are then loaded into the intermodal containers.

Commonly, when a cargo is transported in bulk in a large, intermodal container, the cargo is discharged from the container by tilting the container so that the cargo slides out the back of the container under the force of gravity. This type of discharging procedure is generally disclosed, for example, in U.S. Pat. Nos. 3,696,952 and 3,868,042 and in U.S. patent application Ser. No. 481,989. While this cargo discharging method has received significant commercial acceptance, it has a disadvantage in that it requires an expensive apparatus to tilt the container.

With another method for discharging bulk cargo from a cargo container, a pleated liner is first placed on the container floor when the container is empty, and then the cargo is loaded into the container, over the liner. To discharge the cargo from the container, the liner is pulled out from the cargo container pulling the product out from the container with the liner. Canadian Patent 1,205,106 and U.S. Pat. Nos. 4,470,749 and 4,556,349 disclose this type of technique for discharging cargo. This cargo discharging procedure has not received widespread commercial use, however. A primary reason for the lack of commercial use is that, heretofore, the industry has not been able to provide a discharging method of this general type that, on the one hand, effectively unloads the entire contents of the cargo container, and on the other hand, is still comparatively simple and economically acceptable.

SUMMARY OF THE INVENTION

An object of this invention is to improve methods and apparatus for discharging bulk cargos from cargo containers.

Another object of the present invention is to provide an economical and effective method for discharging bulk cargo from a cargo container, of the type in which a bottom liner is pulled out from the cargo container to pull the cargo out therefrom.

A further object of this invention is to provide an improved liner for lining the bottom of a bulk cargo container, and that facilitates completely unloading the cargo from the container when the liner is pulled out from the container.

A still another object of this invention is to provide a system for securing a bulkhead inside a bulk cargo container, that eliminates the need to use the floor or a bottom portion of the cargo container to support the bulkhead.

An object of the present invention is to suspend a bulkhead inside a cargo container so that an entire bottom section of the bulkhead can be removed, to allow cargo to be discharged from the cargo container, without interfering with the way in which the bulkhead is supported inside the cargo container.

Another object of this invention is to use the floor of a cargo container to support a bulkhead therein, and to do so in a way that allows a bottom opening, which laterally extends completely across a back opening of the cargo container, to be formed in the bulkhead, for discharging cargo from the cargo container, without interfering with the way in which the remainder of the bulkhead is supported inside the cargo container.

A further object of this invention is to pull a liner out from a bulk cargo container by winding the liner onto a mechanism that is mounted and locked directly onto the cargo container.

Another object of the present invention is to provide a mechanism for pulling a liner from a bulk cargo container, that can be easily mounted and locked directly onto standard size intermodal cargo containers.

A further object of this invention is to provide an improved mechanism for pulling a liner from a bulk cargo container, of the type that is supported independent of the cargo container.

Another object of the present invention is to provide a self-supporting mechanism for pulling a liner from a bulk cargo container, and that has a height that can be adjusted according to the height of the floor of the cargo container with which the mechanism is used.

A still further object of this invention is to provide a mechanism to pull a liner from a cargo container, and that is very simple and economical to manufacture, install, and operate.

These and other objectives are attained with a cargo container comprising a container body, a floor liner, and a rear bulkhead. The container body defines an interior cargo space for holding a cargo, and a back opening for conducting cargo into and discharging cargo from that cargo space. The liner is positioned on the container floor in a sequence of overlapping pleats or with a series of spaced rolls that allow the length of the liner to expand. The bulkhead is held inside the container body, immediately forward of the back thereof, to hold the cargo in the cargo space. With several disclosed embodiments, the bulkhead is suspended inside the cargo container—that is, the bulkhead is not significantly supported by the floor of the container, but instead is supported by the sides, the roof, or by both the sides and the roof of the container. In another disclosed embodiment, the bulkhead is supported by the floor of the cargo container, but in a manner that does not obstruct or prevent the formation of a cargo discharge opening that extends substantially completely across the back of the cargo container.

To unload cargo from the container, an opening is formed in the bottom of the bulkhead, and the liner is pulled out from the cargo container. As the liner is so pulled, cargo is pulled out with the liner; and at the same time, the pleats or rolls of the liner unfold or unroll, expanding the length of the liner. The dimensions of the liner, particularly the size and number of pleats or rolls, are selected so that the liner is able to pull out substantially all of the cargo from the container as the liner itself is pulled out of the cargo container.

Preferably, a mechanical apparatus is used to pull the liner out from the cargo container; and this pulling apparatus may comprise a frame, a mandrel, drive means, and connecting means. The mandrel is rotatably supported by and laterally extends across the frame of the pulling apparatus, and the mandrel includes means to connect the floor liner of the cargo container to the mandrel. The drive means of the pulling apparatus is mounted on the frame to rotate the mandrel and wind the container floor liner therearound. The connecting means of the pulling apparatus is mounted on the frame to connect the pulling apparatus to the cargo container, preferably immediately rearward of and below the bottom edge of the back opening of the cargo container.

An alternate mechanism for pulling the liner from the cargo container comprises a frame that supports the whole pulling mechanism independent of the cargo container. This alternate mechanism also includes a mandrel that is rotatably supported by and laterally extends across the frame of the pulling apparatus, and a drive means that is connected to the mandrel to rotate the mandrel and wind the container floor liner therearound. With this alternate pulling mechanism, the mandrel may be positioned at a multitude of heights, allowing the height of the mandrel to be adjusted according to the height of the floor of the cargo container.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 6 is a back perspective view of an alternate liner that may be used in the cargo container of FIGS. 1–3.

FIG. 6A is a back perspective view of a portion of the liner of FIG. 6, illustrating an alternate form in which the liner can be placed on the floor of a cargo container.

FIG. 7 is an enlarged, perspective view of a portion of the liner of FIG. 6, showing how the rolls of the liner may be formed.

FIG. 8 is a side view of a portion of the liner shown in FIG. 7.

FIG. 8A is an enlarged, perspective view of a portion of the liner of FIG. 6, showing perforations that may be formed in the liner.

DETAILED DESCRIPTION OF THE PREFERRED EMBODIMENTS

Figure 1:
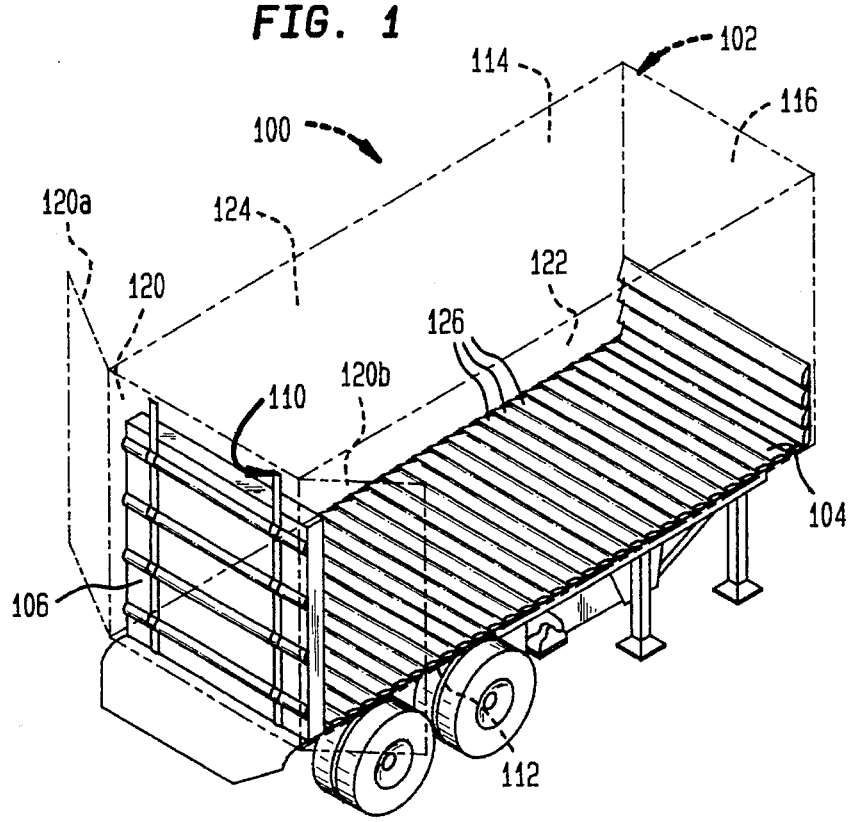
FIG. 1 shows a bulk cargo container.
Figure 2:
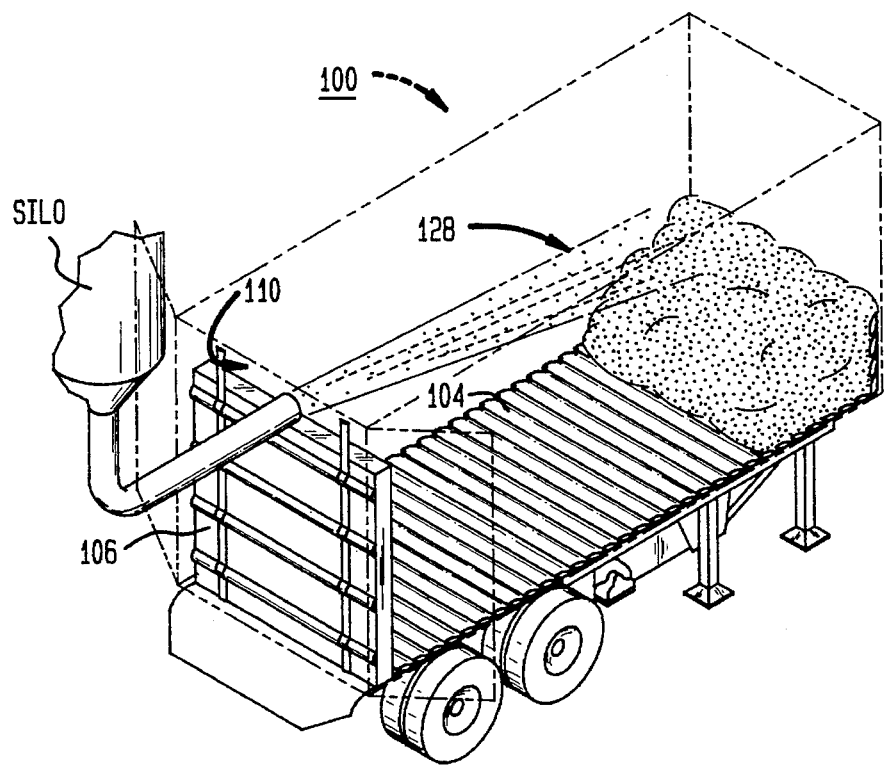
FIG. 2 illustrates a cargo being loaded into the container of FIG. 1.
Figure 3:
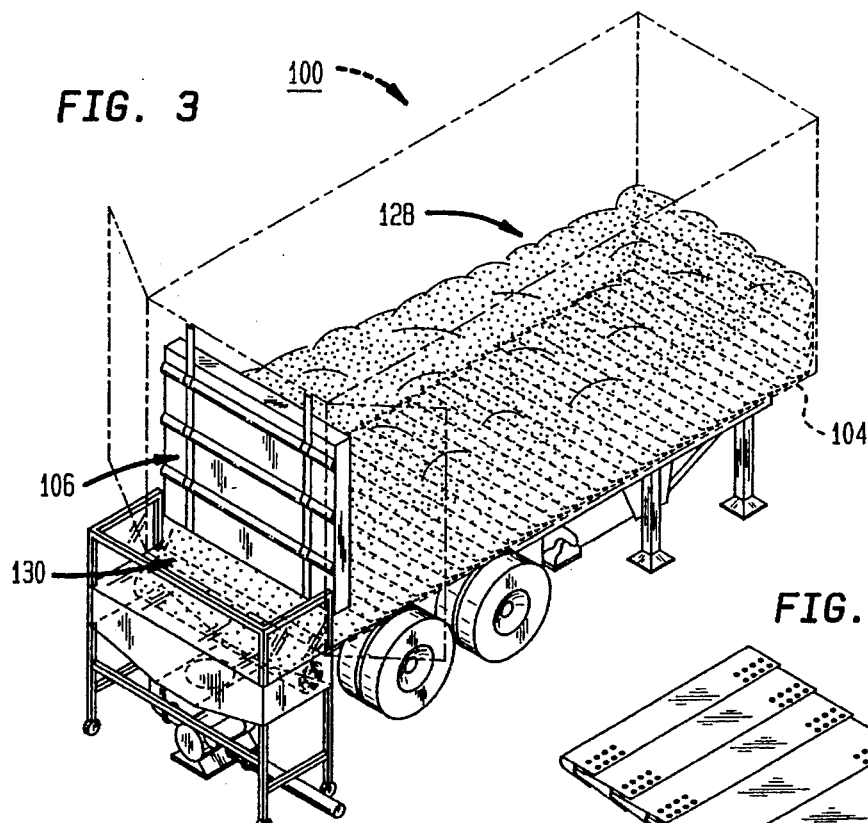
FIG. 3 snows the cargo being discharged from the cargo container.

FIGS. 1–3 illustrate cargo container 100 generally comprising container body 102, liner 104, and bulkhead 106. Generally, container body 102 defines an interior cargo space 110 for holding a cargo; and the container body includes a floor 112, roof 114, front and back walls 116 and 120, and left and right side walls 122 and 124. Back wall 120 includes a pair of outwardly hinged doors 120a and 120b, and when these doors are open, the back wall forms an opening that provides access to the interior of the cargo container. Liner 104 is positioned on container floor 112 in a sequence of overlapping pleats or folded sections 126 that allow the length of the liner to expand; and the bulkhead 106 is secured inside container body 102, immediately forward of back wall 120, to hold a cargo in cargo space 110.

Generally, in operation, a bulk cargo 128 is loaded into cargo space 110 and onto liner 104. Suitable inlet openings (not shown) may be provided in bulkhead 106 to allow the cargo to pass therethrough and into cargo space 110, or the cargo may be conducted into that cargo space through the area above the top of the bulkhead. Once the container is loaded with cargo, it is transported, and the container is unloaded after it reaches its destination.

To unload cargo 128 from container 100, an opening 130 is formed in the bottom of bulkhead 106 and liner 104 is pulled outward from the cargo container. As the liner is so pulled, cargo 128 is pulled out with the liner; and at the same time, the pleats 126 of the liner unfold, expanding the length of the liner. The dimensions of liner 104, particularly the size and number of pleats 126, are selected so that the liner is able to pull out substantially all of the cargo from the container as the liner itself is pulled out of the container cargo. Preferably, as discussed in detail below, a mechanical apparatus is used to pull liner 104 out from cargo container 100. This mechanical apparatus may be mounted on the cargo container, or it may be a free standing unit positioned behind the back wall of the cargo container.

Any suitable cargo container 100 may be employed in the practice of this invention, although preferably container body 102 has a conventional size and shape. Even more preferably, container body 102 is of the type referred to in the art as intermodal and can be transported by truck, railroad, and ship. The present invention may also be practiced with tractor-trailers, over the road trucks, flat bed trucks, or dump trucks, or any container of the type referred to in the art as ISO containers.

Figure 4A:
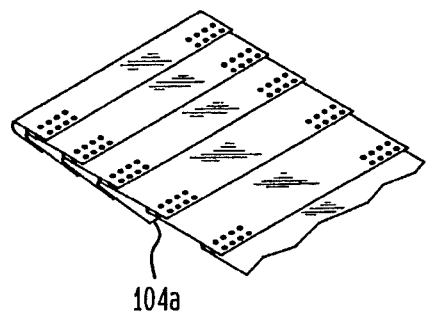
FIG. 4A is a back perspective view of a portion of the sheet of FIG. 4, illustrating an alternate form in which the sheet can be placed inside a cargo container.
Figure 4:
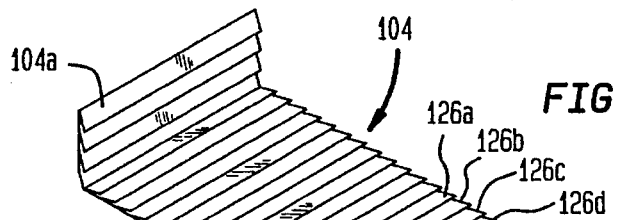
FIG. 4 is a back perspective view of a pleated sheet used to line the floor of the cargo container.
Figure 5:
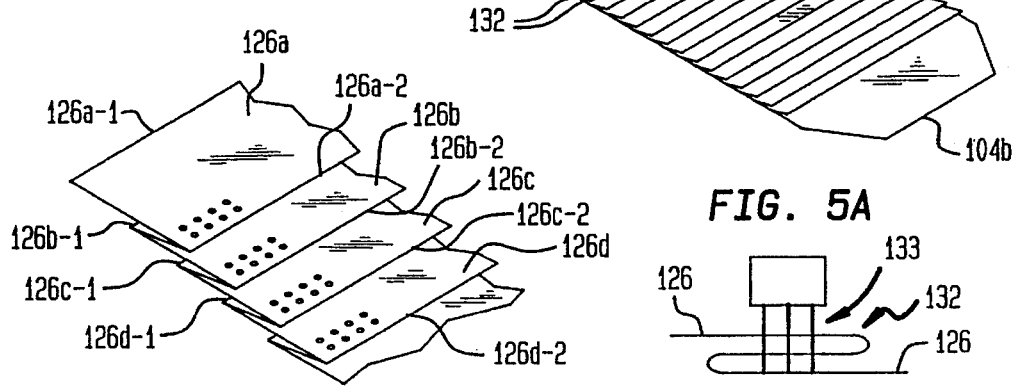
FIG. 5 is an enlarged, perspective view of a portion of the pleated liner of FIG. 4.

FIGS. 4 and 5 illustrate liner 104 in greater detail. With particular reference to FIG. 4, liner 104 has a generally elongated, rectangular shape, including front and back edges 104a and 104b. Also, the folded sections 126 of liner 104 are spaced apart along the length of the liner; and each of the folded sections of the liner extends completely across the width of the liner, substantially perpendicular to the longitudinal axis of the liner. Moreover, as shown in FIGS. 4 and 5, over substantially or completely the entire length of the liner, the folds are directed toward the back edge of the liner and toward the rear doors of the cargo container. Alternatively, those folds may be directed toward the front or nose of the container, and this latter arrangement may be preferred because it may allow the material being unloaded to be pulled much easier along with the liner.

As shown in FIGS. 4 and 5, each folded section includes front and back edges; and in each pair of adjacent folded sections, the back edge of the forward one of that pair of sections is positioned on top of the rearward one of that pair of sections. For example, in FIGS. 4 and 5, four folded sections are specifically referenced at 126a, 126b, 126c, and 126d. The front and back edges of section 126a are referenced at 126a-1 and 126a-2 respectively, and the front and back edges of section 126b are referenced at 126b-1 and 126b-2 respectively. Similarly, the front and back edges of section 126c are respectively referenced at 126c-1 and 126c-2, and the front and back edges of section 126c are respectively referenced at 126d-1 and 126d-2. The back edge 126a-2 of section 126a is on top of folded section 126b, the back edge 126b-2 of section 126b is on top of folded section 126c, and the back edge 126c-2 of this latter section is on top of folded section 126d.

The number and widths of the folded sections 126 of liner 104 are chosen to help ensure that cargo 128 is completely unloaded from cargo container 100 as the liner is pulled out therefrom. However, each folded section may have a random width, and these folded sections may be randomly spaced along the length of liner 104. That length is another variable that may be selected to help ensure that cargo 128 is completely unloaded from cargo container 100 as the liner is pulled out therefrom.

Preferably, the length of the liner is at least equal to the length of container floor 112, and even more preferably, the length of the liner is greater than the length of the container floor. When the liner is installed in cargo container 100, the liner extends over the complete length of the container floor, and the forward portion of the liner either partially or completely extends over front wall 116 of the cargo container, in the form shown in FIG. 4, or that forward portion of the liner may be folded underneath the rest of the liner, as shown in FIG. 4A. The front portion of liner 104 may be provided with attachment means to help secure the liner inside cargo container 100; and this attachment means may comprise eyelets or loops, or nail strip wood or material (woven) (non) integral nailing strip or adhesive tape. Also, the back end portion of liner 104 preferably has truncated corner portions to help pull the liner out of the cargo container, as discussed in greater detail below.

Figure 5A:
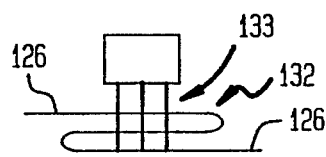
FIG. 5A illustrates one procedure for connecting together adjacent pleats of the liner shown in FIGS. 4 and 5.

In addition, small connections, as shown at 132, are formed between adjacent folded sections 126 to maintain those folded sections held against each other inside cargo container 100 until liner 104 is pulled out of the container. Each connection 132 has very little resistance and is broken as soon as an appreciable pulling force is applied to the bottom of the two layers joined by the connection. With reference to FIG. 5A, these connections may be made, for example, by a needle point seal weld. More specifically, a multitude of heated pins or needles 133 are inserted through an adjacent pair of sections 126 and then withdrawn from those sections. These pins or needles are heated sufficiently to melt small portions of the folded sections 126, which then solidify, fuzing together these small portions of the adjacent folded sections. Adjacent folded sections may be suitably connected together in other ways, though, and for instance, adjacent sections may be connected together by a hot melt procedure, by adhesive tape, contact cement, adhesive or velcro, or these sections may be hot ironed in place or stitched together.

FIGS. 6–8 illustrate an alternate liner 134 that may also be used to pull a bulk cargo from cargo container 100; and liner 134 includes a multitude of rolled sections 136, rather than a multitude of overlapping pleats 126, spaced along the liner to allow the length of the liner to expand as it is pulled outward from the cargo container. Each rolled section 136 includes a section of liner 134 rolled about a given axis. Preferably, each rolled section 136 laterally extends completely across the width of liner 134, substantially perpendicular to the longitudinal axis thereof. The specific number of rolled sections 136 in liner 134, and the size of each rolled section may vary, however, depending on the specific application for which a particular liner is intended.

FIGS. 7 and 8 particularly illustrate one procedure that may be used to form rolled sections 136. To form a rolled section, two adjacent portions of liner 134 are brought together, for example as shown at 140, so as to form a top edge 142; and then these two adjacent portions of the liner are progressively rolled together about that edge, as shown at 144a, 144b, 144c, and 144d, until the desired length or amount of material has been rolled together. As will be understood by those of ordinary skill in the art, each rolled section 136 of liner 134 may be formed by rolling two adjacent portions of the liner in either direction along the length of the liner—that is, either toward the back edge of the liner, as shown in FIGS. 7 and 8, or toward the front edge of the liner.

Preferably, after a given section of liner 134 has been rolled together, means are applied to the formed roll to hold the material thereof in that roll. For instance, a needle or pin point seal weld may be used to connect together the layers of each roll. More particularly, one or more heated pins or needles 146 may be inserted into or through each roll and then withdrawn from the roll. These pins or needles are electrically heated sufficiently to melt small portions of the layers of each roll, which then solidify, connecting together the layers of the roll. Preferably, a multitude of such connections are made along the length of each roll, uniformly spaced therealong. Alternatively, adhesive tape may applied over each roll and connected to adjacent portions of liner 134, on one or both sides of the roll, to prevent the roll from prematurely unravelling.

The length of liner 134 also is preferably at least equal to, and more preferably greater than, the length of container floor 112. When liner 134 is installed in cargo container 100, the liner extends over the complete length of the container floor, and the forward portion of the liner either partially or completely extends over front wall 116 of the cargo container, or is folded underneath the rest of the liner, as shown in FIG. 6A.

Both liners 104 and 134 may be made from any suitable material, although preferably the liners have a high resistance to stretching at least along the lengths of the liners. For example, the liners may be constructed of woven polyethylene or woven polypropylene fabric having a thickness of about seven mils. Alternatively, the liners' material may be reinforced by the use of strips, such as two inch strips of fiberglass tape or metal reinforced tape or polyester reinforced tape, or the liners could be made from bi-axially oriented coextruded cross-laminated plastic film, or coextruded, or cross laminated film. As still additional examples, the liner may be made from natural materials such as cotton, or kraft reinforced paper. Moreover, with reference to FIG. 8A either of the liners 104 or 134 may be provided with a multitude of perforations 150, or with a multitude of protrusions or roughened areas, to increase the roughness of the liner and to give the liner added traction to pull out the cargo from the cargo container.

Floor liners 104 and 134 may be used in conjunction with other liners that line the interiors of cargo containers. For example, U.S. Pat. No. 4,799,607 and U.S. patent application 481,989 disclose expandable container liners that are used to line the interiors of cargo containers to help keep the container surfaces clean and to help protect the cargo inside the container. After such a container liner has been installed inside a cargo container, liner 104 or liner 134 may be installed inside the former liner, over the floor of the cargo container, to subsequently discharge product from the lined cargo container.

As previously mentioned, and with reference again to FIGS. 1–3, bulkhead 106 is secured inside cargo container 100, immediately forward of back wall 120, to hold a cargo in cargo space 110. In particular, the bulkhead is used to hold the cargo in that space both while the cargo is being loaded thereinto and while the container is being transported. As will be understood by those of ordinary skill in the art, typically, a discharge opening must be formed in the bulkhead to allow cargo to be discharged from the cargo container. In order to achieve a complete unloading of the cargo when cargo is discharged from container 100 by means of a procedure in which a bottom liner is pulled out from the container, it is important that a wide opening be formed across the bottom of the bulkhead.

Heretofore, however, it has been difficult to form suitable wide openings in the bottoms of flexible or yieldable bulkheads used to hold bulk cargo in cargo containers. This is because these prior art bulkheads have been supported by the floors of the cargo containers; and any very wide opening formed in the bottom of such a bulkhead weakens the bulkhead, and the bulkhead may partially collapse and interfere with the flow of the product outward from the cargo container.

In accordance with one aspect of the present invention, these prior art difficulties are overcome by suspending bulkhead 106 inside cargo container 100—that is, the bulkhead is supported by a portion of the cargo container other than floor 112 thereof, and for example, the bulkhead may be supported by the sides 122, 124, by the roof 114, or by both the sides and the roof of the cargo container. In this way, an opening may be formed completely across the bottom of the bulkhead, or a bottom portion of the bulkhead may be removed, to allow cargo to be discharged from the cargo container without significantly interfering with the way in which the bulkhead is supported inside the cargo container.

Figure 9:
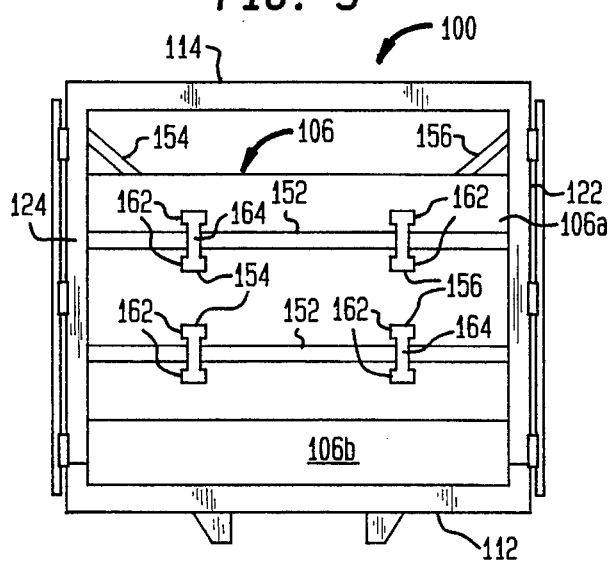
FIG. 9 is a back view of the bulkhead used in the cargo container of FIGS. 1–3, and shows one arrangement for suspending the bulkhead inside the cargo container.
Figure 10:
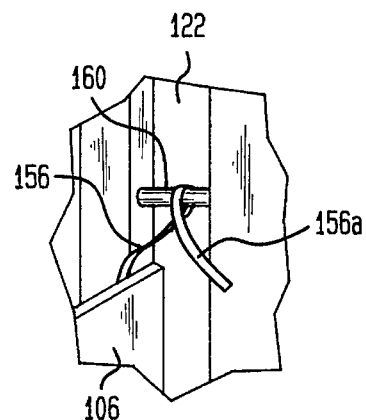
FIG. 10 illustrates how a support strap for the bulkhead may be mounted on the cargo container.
Figure 11:
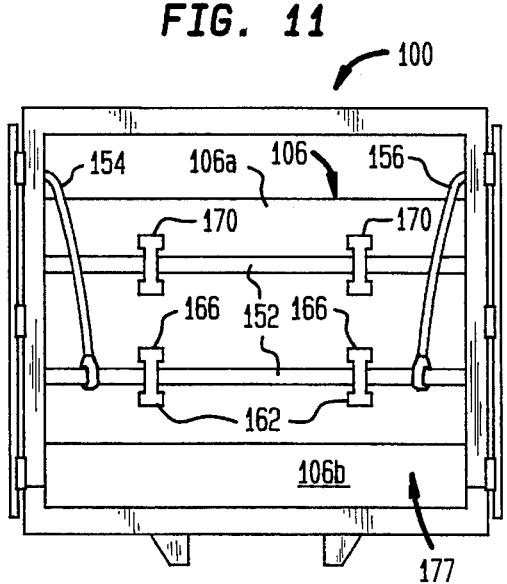
FIG. 11 shows an alternate arrangement for suspending the bulkhead inside the cargo container.
Figure 12:
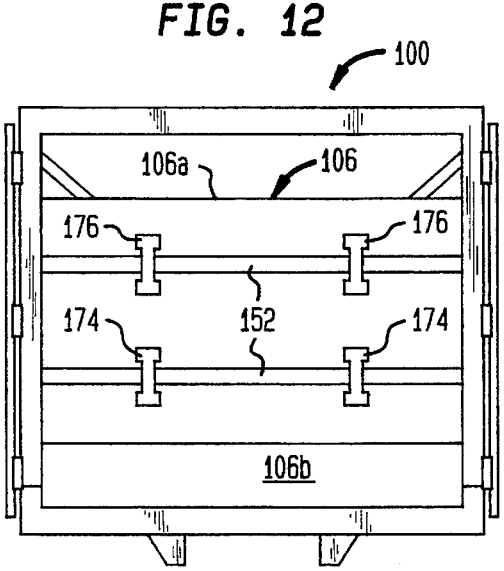
FIG. 12 shows a third arrangement for suspending the bulkhead inside the cargo-container.

FIGS. 9–13 illustrate a preferred embodiment of bulkhead 106 and various arrangement for suspending the bulkhead inside cargo container 100. FIGS. 9, 11, and 12 also show a pair of reinforcing members or bars 152 that are mounted inside cargo container 100 to reinforce bulkhead 106. More specifically, reinforcing bars 152 are located rearward of bulkhead 106, extend laterally across the bulkhead, and engage both the bulkhead and the cargo container body to transfer loads on the bulkhead to the cargo container body.

With the support arrangements shown in FIGS. 9–11, at least one and preferably two straps 154, 156 are connected to upper portions of cargo container 100 and used, either directly or indirectly, to suspend bulkhead 106 therewithin. For example, with particular reference to FIGS. 9 and 10, a first end of each strap, for example end 156a of strap 156, may be looped over a hook or bar 160 mounted on an inside surface of cargo container 100, and a second end of each strap may be inserted through one or more slits 162 formed in the bulkhead. The ends of each strap may be tied or connected together, forming one large loop from strap 154 and one large loop from strap 156 to mount the bulkhead on the cargo container. Alternatively, each end of each strap 154, 156 may be tied to a respective adjacent portion of the same strap, forming top and bottom smaller loops on strap 154, and top and bottom smaller loops on strap 156 to mount the bulkhead on the cargo container. As a still further alternative, each strap end may be tied to a respective portion of cargo container 100, or to a respective hook or bar mounted on the inside surface of the cargo container, to hold bulkhead 106 thereon.

As will be appreciated by those of ordinary skill in the art, numerous other procedures may be used to connect straps 154, 156 to cargo container 100 and to bulkhead 106, and for instance, the straps may be stapled to the bulkhead. Further, straps 154, 156 may be employed to hold reinforcing bars 152 in place; and for example, as generally depicted in FIG. 9, each strap may be wrapped or looped around, or simply extend over a respective one side of each of bars 154 and 156, for instance as shown at 164, to hold those bars.

FIG. 11 illustrates a technique for using straps 154, 156 to indirectly suspend bulkhead 106. With this procedure, one of the reinforcing bars 152, for example the lower of these two bars, is directly suspended by straps 154 and 156, and then a second set of straps, referenced at 166, are mounted on or wrapped around that one reinforcing bar and used to suspend bulkhead 106. More particularly, straps 154, 156, and preferably the lower ends 154b, 156b thereof, are looped around, wrapped around, or otherwise connected to one of the reinforcing bars, preferably to sides thereof, to hold the reinforcing bar in place. Similarly, each of straps 166 is looped or wrapped around or otherwise mounted on the one reinforcing bar and connected to bulkhead 106. These straps 166 may be connected to bulkhead 106 in any suitable way; and for example, ends of straps 166 may be inserted through slits 162 and tied together on the front side of the bulkhead. Alternatively, straps 166 may be stapled or glued to the bulkhead. With this general procedure, a third set of straps 170 may be connected to or mounted on bulkhead 106 and looped or wrapped around the second of the reinforcing bars to hold that bar in its desired position adjacent the bulkhead.

Figure 13:
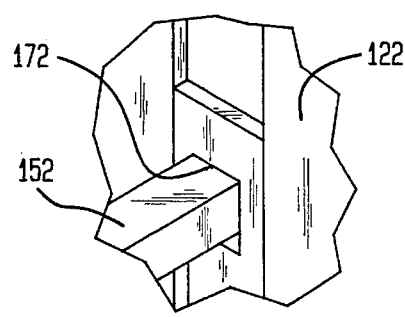
FIG. 13 illustrates how a reinforcing bar for the bulkhead may be supported inside the cargo container.

FIGS. 12 and 13 illustrate another procedure for suspending bulkhead 106 from one or both of the reinforcing bars 152. In this case, however, the ends of that one or both of the reinforcing bars extend into small recesses or notches (one of which is shown at 172 in FIG. 13) formed in the side walls 122, 124 of cargo container 100, and are thus directly supported by those side walls, rather than by straps 154, 156. In the event that only one of the reinforcing bars 152 is supported in notches 172, a set of straps 174 is wrapped or looped around that reinforcing bar and connected to bulkhead 106 to suspend the bulkhead from that reinforcing bar. A second set of straps 176 may be connected to bulkhead 106 and wrapped or looped around the second reinforcing bar to hold that bar in place. In the event that both reinforcing bars 152 extend into receiving notches 172 in the side walls of cargo container 100, a set of straps is mounted on either of those bars and connected to the bulkhead to support the bulkhead; and if desired, a second set of straps may be mounted on the other of the reinforcing bars and also connected to the bulkhead to further support the bulkhead.

Straps 154, 156, 166, 170, 174 may be made of any suitable material, although preferably they are made from a high strength material. For instance, the straps may be constructed of woven polyethylene and polypropylene, or the straps may be made from strips of fiberglass tapes, metal reinforced tapes, polyester reinforced tapes, or nylon webbing. As still additional examples, the support straps 154, 156, 166, 170, 174 may be made from woven nylon or polyester webbing or rope or from braided rope or twine, coextruded cross laminated plastic film, or coextruded, or cross laminated film.

Preferably, bulkhead 106 is comprised of upper and lower separable sections 106a and 106b; and in use, the lower section of the bulkhead is separated and removed from the upper section to form a discharge opening or outlet in the bulkhead. Bulkhead sections 106a and 106b may be releasably connected together in any suitable manner; and for example, these bulkhead sections may be stapled or nailed together. Alternatively, one of these bulkhead sections may be provided with a plurality of hooks, and the other of the bulkhead sections may be provided with a plurality of openings or eyelets adapted to mount onto those hooks to connect the two bulkhead sections together. Also, bulkhead sections 106a and 106b may be pivotally connected together along their adjacent edges so as to allow section 106b to pivot upward and outward, about the top edge of section 106b, and thereby form a discharge opening in bulkhead 106.

When bulkhead 106 is comprised of upper and lower separable sections, it may be desirable to position a reinforcing bar, shown at 177 in FIG. 11, across the lower bulkhead section to brace that bulkhead section against cargo inside cargo container 100. This reinforcing bar 177 may be supported in any suitable manner; and for instance, the bar 177 may be supported by straps 154, 156, 166, 170, or 174 or by additional straps (not shown) or by the sides of cargo container 100. Preferably, this reinforcing bar 177 can be easily removed or disassembled to allow bulkhead section 106b to be moved or removed to form a discharge opening in the bulkhead. For instance, bar 177 may be collapsible or comprised of a plurality or multitude of separable sections that are releasably connected together by pins, bolts, or similar means.

As will be understood, it is not necessary that the bulkhead be comprised of separable sections; and for instance, the bulkhead may be formed from one piece or section of material, and a lower portion or area of the bulkhead may be cut away from an upper portion thereof to form the desired discharge opening in the bulkhead.

Figure 14:
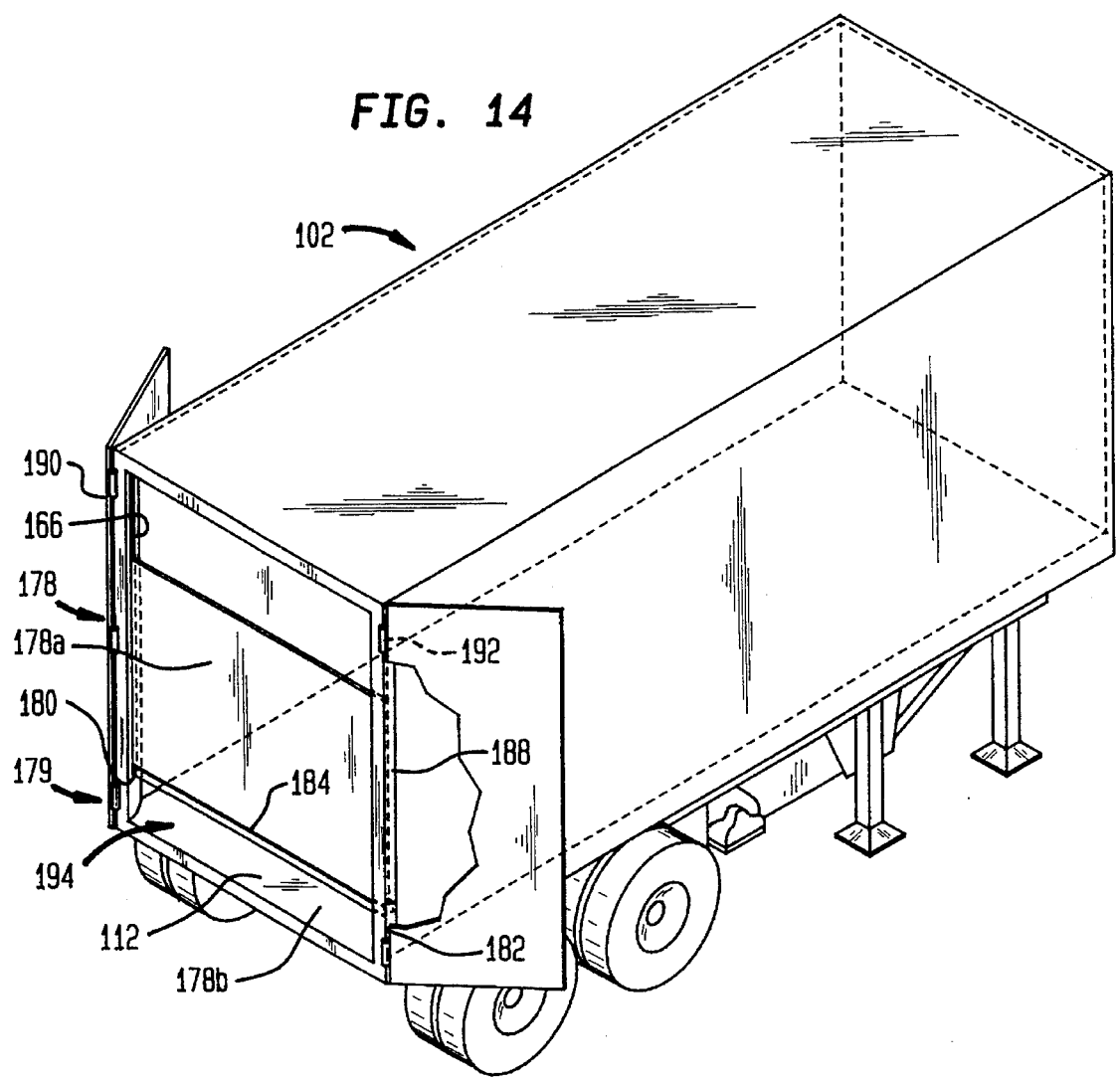
FIG. 14 is a back perspective view of the cargo container of FIGS. 1–3, with an alternate bulkhead installed therein.
Figure 15:
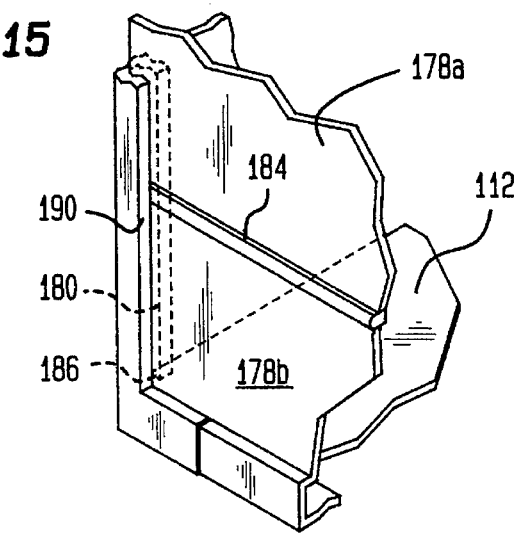
FIG. 15 is an enlarged view of a portion of FIG. 14, showing a part of the support means for the alternate bulkhead.

FIGS. 14 and 15 illustrate an alternate bulkhead 178 and means 179 for supporting that bulkhead in cargo container 100. Although this bulkhead is supported by floor 112 of the cargo container, the manner in which the bulkhead is supported does not obstruct or prevent the formation of a cargo discharge opening that extends substantially completely across the back of the cargo container. Generally, bulkhead 178 includes upper and lower sections 178a, 178b, and the support means for the bulkhead includes left and right spacers 180, 182 and cross bar 184.

Left and right spacers 180, 182 are secured inside container body 102, immediately adjacent the left and right side walls thereof, respectively, and cross bar 184 is supported by and laterally extends between the left and right spacers. More specifically, spacers 180, 182 are positioned inside vertical grooves or channels 186, 188 formed by left and right back corner posts 190, 192 of cargo container 100, and each of these spacers is supported on and extends upward from floor of cargo container. Also, cross bar 184 rests on and extends between top ends of spacers 180, 182. Preferably, the top ends of spacers 180, 182 are at the same height and cross bar 184 is substantially horizontal; and preferably, this cross bar also extends into channels 186, 188 so that the corner posts 190, 192 hold the cross bar against forward and rearward movement inside the cargo container.

Spacers 180, 182 and cross bar 184 may be made of any suitable material and have any suitable shape. For instance, these elements may be made of metal, wood, or plastic, although preferably the cross bar is made of metal. Further, these elements may have rectangular, square, or circular cross-sectional shapes, although preferably cross bar 184 has a generally flat upper surface to help hold and support bulkhead section 178a thereon.

Bulkhead section 178a, as mentioned immediately above, is supported on cross bar 184 and extends upward therefrom. Preferably, bulkhead 178 literally extends completely across the back opening of cargo container 100; and even more preferably, the left and right side edges of the bulkhead extend into channels 186, 188 respectively, so that corner posts 190, 192 help to hold the bulkhead in place in the cargo container against forward and rearward movement. Other or additional means may be employed to hold bulkhead 178 in place, however; and for example, wood or metal beams or bars may be secured inside the cargo container, rearward of the bulkhead, to hold and to brace the bulkhead inside the cargo container.

Lower bulkhead section 178b is held in place below cross bar 184 and between left and right side walls; and preferably, as shown in FIG. 14, the bulkhead section 178b completely, or substantially completely, covers the area or space 194 between container floor 112 and cross bar 184 and between left and right corner posts 190, 192. Any suitable means may be used to hold bulkhead section 178b in place; and for instance, this bulkhead section may be connected to the container floor, to the corner posts, to the cross bar, or to bulkhead section 178a to hold the bulkhead section 178b in its desired position. Bulkhead section 178b also may extend into grooves 186, 188, so that corner posts 190, 192 help to hold this bulkhead section in cargo container 100.

Bulkhead section 178b is preferably releasably held in place, and the bulkhead section is completely, or substantially completely, removed to form a cargo outlet extending between cross bar 184 and container floor 112 and between container posts 190, 192 to discharge cargo from container 100. Since the upper bulkhead section 178a is fully supported by cross bar 184 and spacers 180, 182, that bulkhead section 178a is still fully supported even after lower bulkhead section 178b is removed to form the above-mentioned cargo outlet. It should be noted that the use of lower bulkhead section 178b is not always necessary; and, depending on the size of the outlet opening and the type of cargo with which the bulkhead is used, that outlet opening may be left uncovered.

Preferably, bulkheads 106 and 178 are made from plastic, craft paper, or corrugated material; and the bulkheads are provided with suitable openings, or with score lines to facilitate the formation of suitable openings, to allow material to be loaded into the cargo container through the bulkheads. The bulkheads may be made of any other suitable material, though; and, for instance, the bulkheads may be made from wood. Moreover, reinforcing bars 152 and 177 are preferably made from a metal, although these bars may be made from other materials such as wood or plastic.

Figure 16:
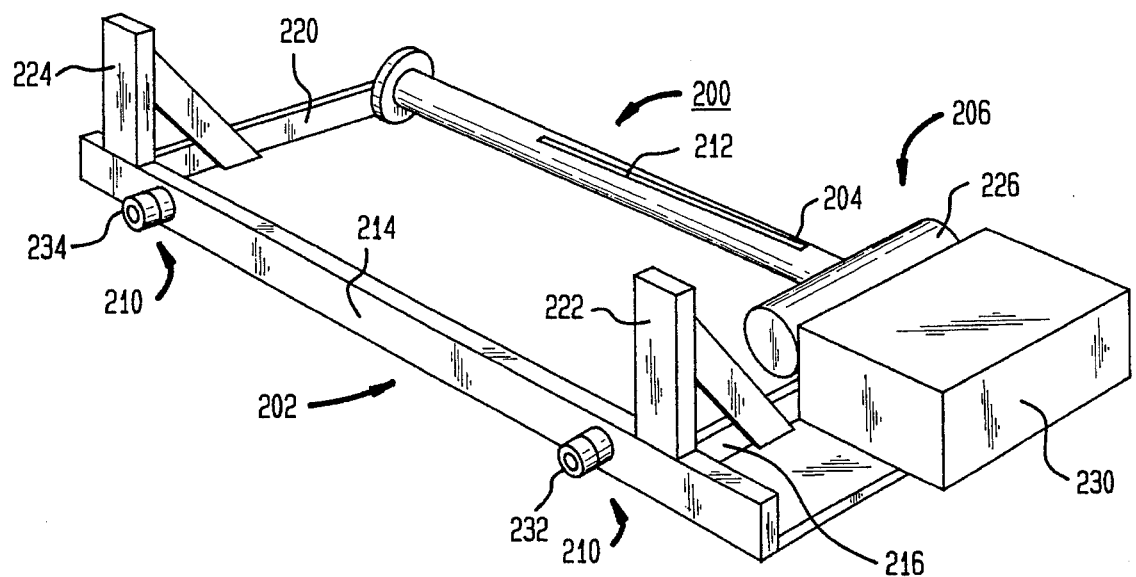
FIG. 16 is a perspective view of an apparatus for pulling a floor liner from the cargo container of FIGS. 1–3.
Figure 17:
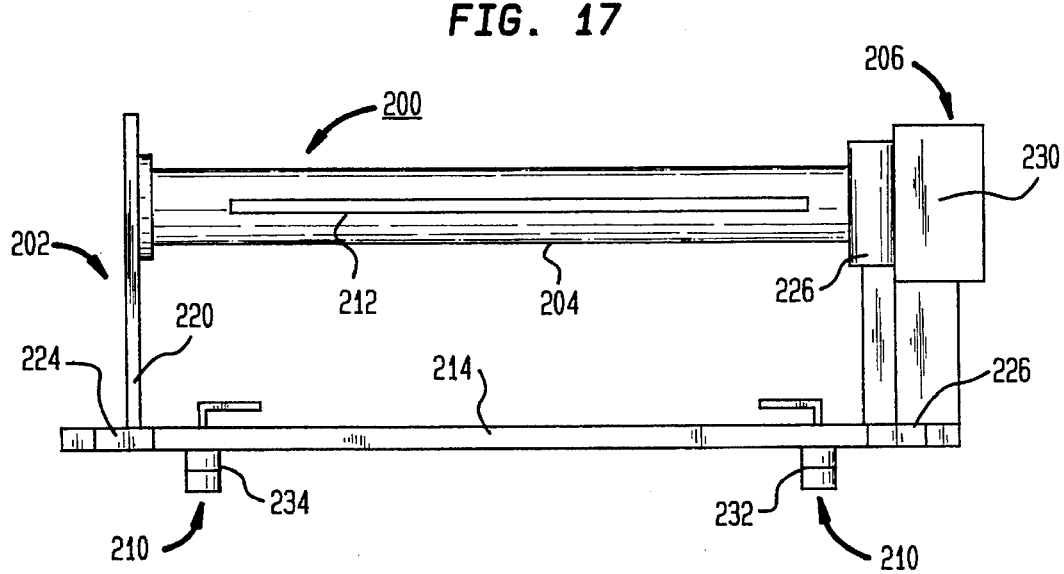
FIG. 17 is a top view of the pulling apparatus of FIG. 16.

FIGS. 16 and 17 illustrate an apparatus 200 for pulling liner 104 outward from cargo container 100; and, generally, this apparatus comprises frame 202, mandrel 204, drive means 206, and connecting means 210. Connecting means 210 is mounted on frame 202 to connect unloading apparatus 200 to cargo container 100, preferably immediately rearward of and below the bottom edge of the back opening thereof. Mandrel 204 is rotatably supported by and laterally extends across frame 202 and includes means 212 to connect liner 104 to the mandrel, and drive means 206 is mounted on the frame and engages the mandrel to rotate the mandrel to wind the liner therearound and, thereby, to pull the liner outward from cargo container 100.

More specifically, frame 202 includes main transverse beam 214, left and right side beams 216 and 220, and left and right stabilizing members 222 and 224. Transverse beam 214 is adapted to extend laterally across cargo container 100, immediately adjacent or slightly below the bottom edge of the back opening thereof. Left and right side beams 216 and 220 are connected to and extend rearward from the left and right sides, respectively, of beam 214, and mandrel 204 is rotatably supported by and laterally extends between the left and right side members.

In use, as liner 104 is wound around mandrel 204, apparatus 200 may tend to pivot upward about main transverse beam 214, and stabilizing members 222 and 224 are provided to limit or to prevent such pivoting movement. In particular, left and right stabilizing brackets 222 and 224 are connected to and extend upward from the left and right sides of beam 214, respectively; and in case apparatus 200 tends to pivot upward about transverse beam 214, those stabilizing brackets engage or abut against the left and right back sides of cargo container 100, preventing further such pivoting movement and thereby stabilizing frame 202 and the entire unloading apparatus 200 during the unloading process.

The various members or elements of frame 202 may be made of any suitable material and can be connected together in any suitable way. For instance, these elements may be made from a metal and welded or bolted together.

Mandrel 204 is rotatably mounted on frame 202; and more specifically, the mandrel is rotatably supported by and laterally extends between side beams 216 and 220 of the frame. To pull a liner 104 from cargo container 100, the back end of that liner is connected to mandrel 204, and then the mandrel is rotated to wind the liner onto and around the mandrel 204. To facilitate connecting liner 104 to the mandrel, the mandrel preferably includes an axially extending slot 212 that radially extends completely through the mandrel; and with particular reference to FIGS. 4 and 16, to connect liner 104 to this mandrel 204, the back edge 104b of the liner is pulled through slot 212. Alternatively, mandrel 104 may be provided with raised portions that allow it to grip liner 104. After the liner is connected to the mandrel, the mandrel is then rotated to wind the liner onto the mandrel.

Drive means 206 is mounted on frame 202 and is provided to rotate mandrel 204, and preferably the drive means includes a winch 226 and a motor or engine 230. Winch 226 is mounted on frame 202, specifically left side member 216, and is directly connected to mandrel 204 to rotate the mandrel. Alternatively, winch 226 may be mounted on right side member 220 of frame 202. Engine or motor 230 is also mounted on frame 202 and is connected to winch 216 to operate that winch. Any suitable winch, motor, or engine may be used in the practice of the present invention.

However, often cargo containers of the general type disclosed in FIGS. 1–3 are transported by trucks or other vehicles that includes a power source, such as a hydraulic pump, an electric battery or an electric generator; and preferably, motor 230 can be operated by the power source on the vehicle that carries the cargo container 100. In particular, if this vehicle has a hydraulic pump, it may be preferred to provide unloading apparatus 200 with a hydraulic motor; while if the transporting vehicle has an electric battery or generator, it may be appropriate to provide apparatus 200 with an electric motor.

Connecting means 210 preferably includes left and right connecting assemblies 232 and 234 mounted, respectively, on the left and right sides of frame 202 to connect the frame, respectively, to left and right sides of cargo container 100. An important advantage of apparatus 200 is that the connecting assemblies 232 and 234 thereof are particularly well adapted to mount apparatus 200 onto an intermodal cargo container having conventional, lower back corner castings spaced apart a standard distance.

Figure 18:
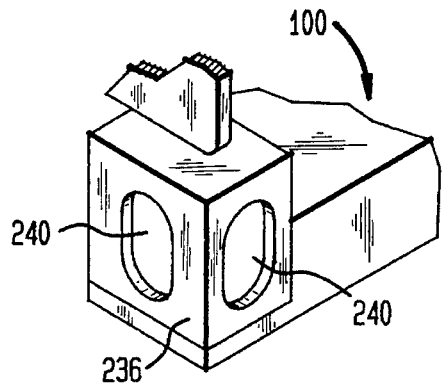
FIG. 18 is a perspective view of a corner casting of the cargo container shown in FIGS. 1–3.

To elaborate, standard intermodal cargo containers of the type shown in FIGS. 1–3 typically have corner members, referred to as corner castings, located at, among other places, the back lower left and back lower right corners of the container body. One corner casting is shown at 236 in FIG. 18; and as illustrated therein, the corner castings form a multitude of openings 240 that are used to lock the cargo containers onto supporting members such as trucks or railroad car frames or other containers. Because of the way in which these corner castings are used, industry standards have developed that govern the size, shape, and spacing of the corner castings. In order to make apparatus 200 very easy to mount onto a cargo container having such lower back corner castings, connecting assemblies 232 and 234, first, are specifically designed to lock into corner castings, and second, are spaced apart a distance substantially equal to a standard distance between such corner castings.

Figure 19:
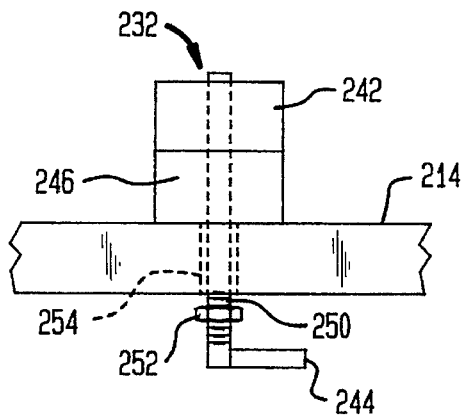
FIG. 19 is a top view of one of the connecting assemblies of the apparatus of FIGS. 16 and 17.
Figure 20:
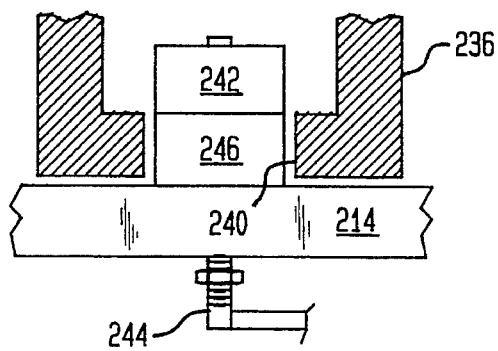
FIG. 20 shows the connecting assembly of FIG. 19 inserted into the corner casting of FIG. 18.
Figure 21:
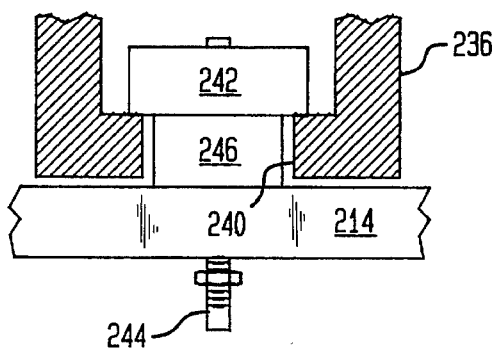
FIG. 21 shows the connecting assembly locked inside the corner casting.

Left and right connecting assemblies 232 and 234 are substantially identical, and thus only one will be described herein in detail. With reference to FIG. 19, each of the connecting assemblies includes twist lock 242, handle 244, spacer 246, support rod 250, and adjusting nut 252. Twist lock 242 is rotatably mounted on frame 202, specifically transverse beam 214, adjacent one end thereof; and handle 244 is connected to the twist lock to pivot that lock to facilitate inserting the twist lock into, and then locking it inside, one of the corner castings of cargo container 100. More specifically, twist lock 242 is pivotal between, and handle 244 is used to pivot the twist lock between, first and second positions shown in FIGS. 20 and 21, respectively. In this first position, twist lock 242 can be inserted through an opening 240 in, and into the interior of, corner casting 236; and in the second position, twist lock 242 is locked inside corner casting 236. Preferably, as illustrated in the drawings, twist lock 242 is disposed on a forward or front side of beam 214, and handle 244 is disposed on a rearward or back side of that beam.

Twist lock 242 may be pivotally mounted on beam 214 and handle 244 may be connected to the twist lock in any suitable way. For example, a through opening 254 may be formed in beam 214, and rod 250 may be inserted through that opening such that the rod is supported by beam 214 and is rotatable in opening 254. At the same time, twist lock 242 is rigidly mounted on a forward end of rod 250, and handle 244 is connected to a back end of rod 250.

Spacing member 246 is connected to transverse beam 214, between that beam and twist lock 242, to maintain the twist lock spaced from the transverse beam. This facilitates inserting the twist lock into the interior of corner casting 236 and locking the twist lock therein. As shown in FIG. 19, preferably, support rod 250 also extends through spacing member 246.

Figure 22:
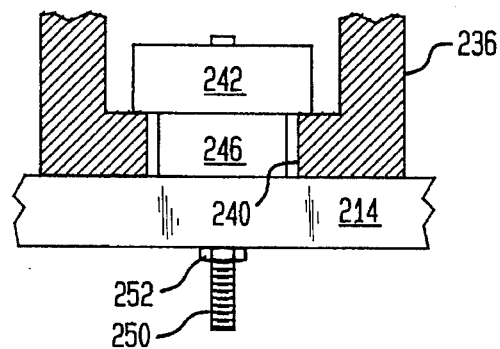
FIG. 22 shows the connecting assembly tightly clamped onto the corner casting.

Preferably, each connecting assembly 232 and 234 also includes tightening means connected to the twist lock to pull the twist lock toward transverse beam 214 and thereby to connect frame 202 tightly to a respective one of the corner casting members on container 100. With the embodiment of connecting assembly 232 illustrated in the drawings, this tightening means comprises adjusting nut 252, which is threadably mounted on rod 250, rearward of beam 214. In operation, once twist lock 242 is locked inside corner casting 236, nut 252 is threaded forward on rod 250 to bring the nut into engagement with the backside of beam 214 and then to pull rod 250 and twist lock 242 rearward, thereby clamping the corner casting securely between twist lock 242 and beam 214, as shown in FIG. 22.

Figure 23:
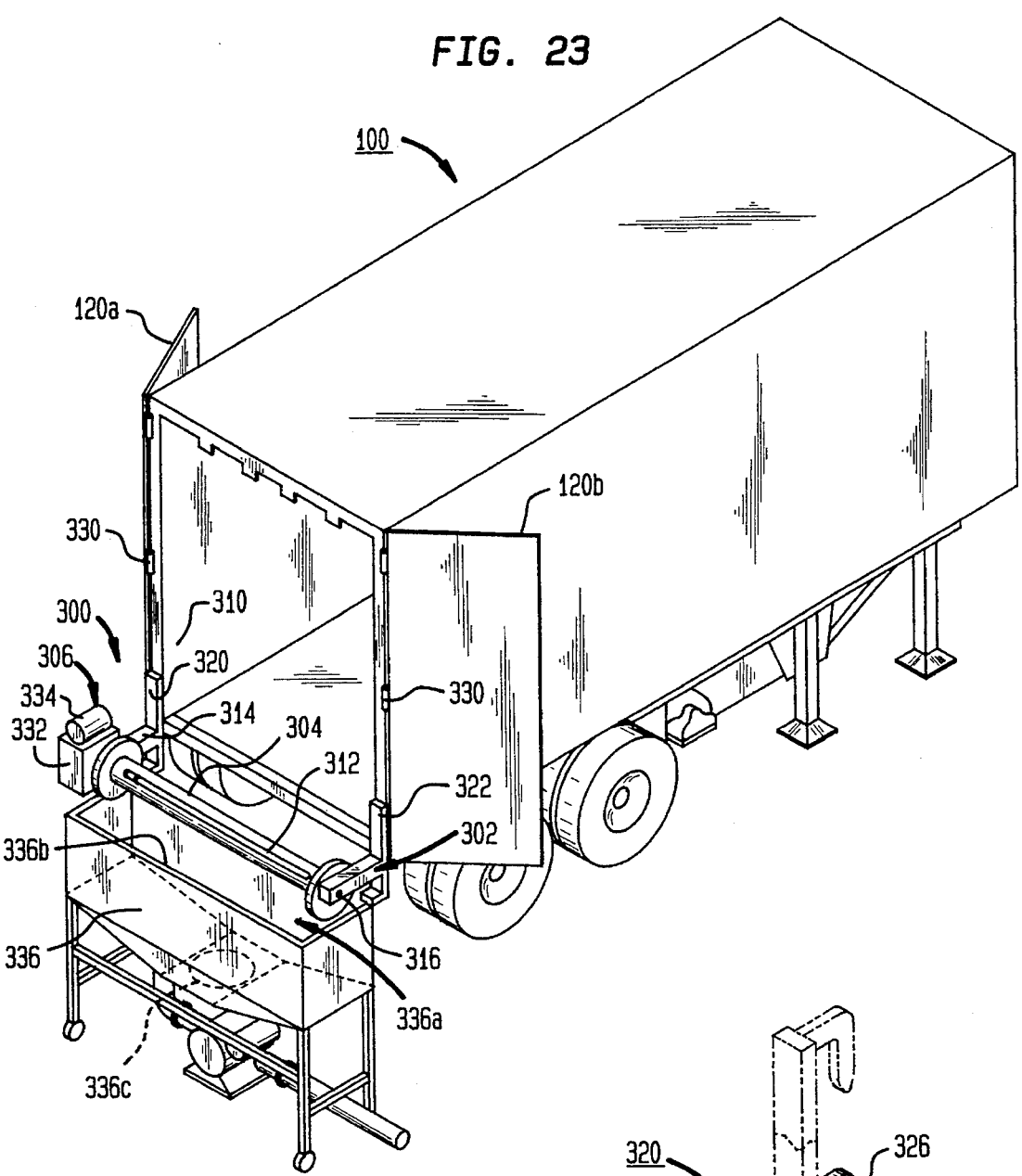
FIG. 23 shows an alternate liner pulling apparatus mounted on the cargo container of FIGS. 1–3.
Figure 24:
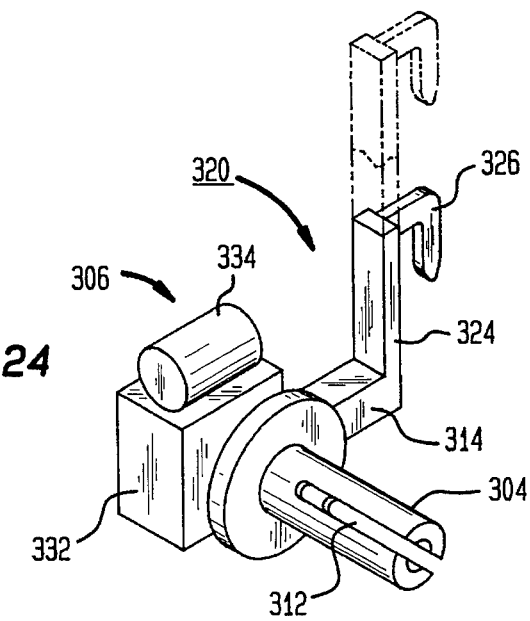
FIG. 24 illustrates a detail of the pulling apparatus shown in FIG. 23.

FIGS. 23 and 24 illustrate an alternate unloading apparatus 300 comprising frame 302, mandrel 304, drive means 306, and connecting means 310. Generally, the functions of the main components of apparatus 300 are similar to the functions of the corresponding components of apparatus 200. In particular, connecting means 310 is mounted on frame 302 to connect unloading apparatus 300 to cargo container 100, preferably immediately rearward of and below the bottom edge of the back opening thereof. Mandrel 304 is rotatably supported by and laterally extends across frame 302 and includes means 312 to connect liner 104 to the mandrel, and drive means 306 is mounted on the frame and engages the mandrel to rotate the mandrel to wind the liner therearound and, thereby, to pull the liner outward from the cargo container.

With apparatus 300, frame 302 comprises left and right side members 314 and 316; and connecting means 310 comprises left and right connecting members 320 and 322 connected to frame members 314 and 316, respectively, to connect frame 302 to the left and right sides of cargo container 100. Connecting members 320 and 322 are substantially identical, and hence only one will be described herein in detail. With particular reference to FIG. 24, connecting member 320 preferably includes base 324 and hook 326. Base 324 is connected to, and indeed may be integral with, side member 314 of frame 302, and base 324 extends upward from that frame side member. Hook 326, in turn, is connected to and extends outward from base 324 and is provided to hook or mount connecting member 320 onto the left side of cargo container 100; and this may be done, for instance, by mounting hook 326 onto a left back door hinge of the cargo container. To elaborate, each of the back doors 120a and 120b of container 100 is, typically, pivotally connected to a respective one lateral side of the cargo container by one or more hinges 330, and hook 326 may be shaped to mount securely on one of those back hinges.

Other types of connecting or attaching members 320 and 322 may be used on apparatus 300 to connect that apparatus to container 100. For instance, cargo containers are also commonly provided with a multitude of lash rings along the upper left and upper right sides of the containers to secure materials or items inside the containers. Apparatus 300 may be provided with connecting members that connect or hook onto those lash rings to hold apparatus 300 in its desired position.

The various elements of frame 302 and connecting means 310 may be made of any suitable material, such as metal, and may be connected together in any acceptable manner, such as by welding or by bolting the elements together.

Mandrel 304 is rotatably mounted on frame 302; and in particular, the mandrel is rotatably supported by and laterally extends between side beams 314 and 316 of frame 302. To help connect a liner to the mandrel, the mandrel preferably forms an axially extending slot 312, similar to slot 212 of mandrel 204, that radially extends completely through the mandrel. Alternatively, mandrel 304 also may be provided with a raised surface to grip a liner or conveyor sheet.

Drive means 306 is mounted on frame 302 and is provided to rotate mandrel 304, and preferably this drive means includes a winch 332 and a motor or engine 334. Winch 332 is mounted on frame 302, specifically left side member 314, and is connected to mandrel 304 to rotate the mandrel. Engine or motor 334 is also mounted on frame 302 and is connected to winch 332 to operate that winch. Any suitable winch, motor, or engine may be used with apparatus 300; although, as is the case with apparatus 200, preferably engine or motor 334 can be operated with the power source on any vehicle employed to carry container 100.

Both apparatus 200 and apparatus 300 may be provided with a hopper, shown at 336 in FIG. 23, either to collect the cargo unloaded from container 100, or to help convey that cargo to a given location. As illustrated in FIG. 23, hopper 336 is located below mandrel 304 to receive the cargo from cargo container 100. More specifically, hopper 336 defines interior 336a, inlet 336b, and outlet 336c. Inlet 336b is located at the top of the hopper and is in communication with the interior thereof to conduct the cargo into the hopper interior, and outlet 336c is located at the bottom of the hopper and is in communication with the interior thereof to discharge the cargo from the hopper.

Preferably, hopper outlet 336c is adapted to be connected to a tube, hose or rotary air lock, as shown, that may by used to conduct the cargo from the hopper to another location. For example, pneumatic pressure may be used to force the cargo through that tube or hose.

Hopper 336 may be supported in any suitable manner; and for instance, hopper may be provided with a plurality of legs or a base, which may be adjustable, to support the hopper on the Ground. Alternatively, the hopper may be connected to and supported by frame 302 of apparatus 300 or frame 202 of apparatus 200, or the hopper may be connected to and supported by cargo container 100.

In use, apparatus 200 or apparatus 300, either with or without hopper 336, is located adjacent or connected to cargo container 100. Then, the back edge of liner 104 or 134 is inserted through the axial slot 212 of mandrel 204 or the axial slot 312 of mandrel 304, and the mandrel is rotated to pull the liner outward from the cargo container. The cargo comes out of the container with the liner and either falls onto the ground below the mandrel or, optionally, falls into hopper 336. The cargo may thence be conducted from the hopper via a delivery tube connected to the hopper outlet, or the cargo may be carried in the hopper to a desired location.

Figure 25:
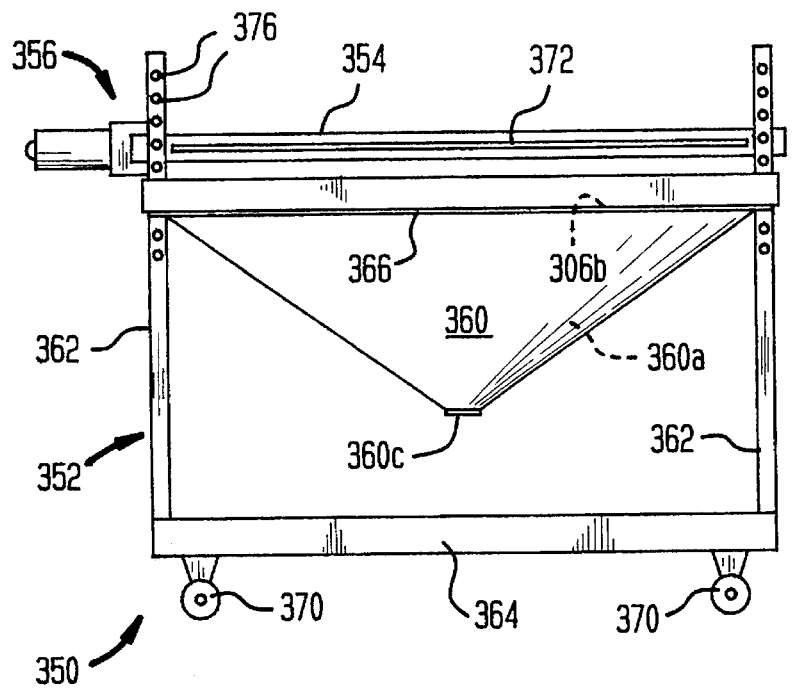
FIG. 25 is a front view of another apparatus for pulling a floor liner from a cargo container.
Figure 26:
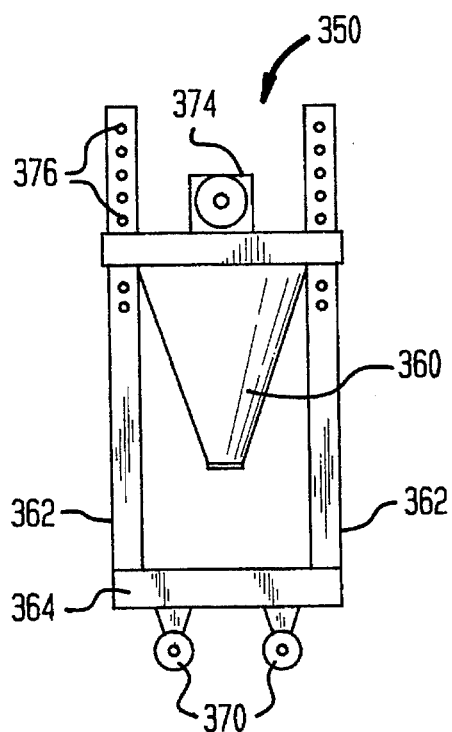
FIG. 26 is a side view of the apparatus of FIG. 25.

FIGS. 25 and 26 show another alternate unloading apparatus 350, generally, comprising support frame 352, pulling means such as mandrel 354, drive means 356, and hopper 360. Unloading apparatus 350 is self-supporting, and thus it is not necessary to connect this unloading apparatus to the cargo container with which the unloading apparatus is used. Moreover, with apparatus 350, the height of mandrel 354 and hopper 360 are adjustable; and in particular, the mandrel and hopper can be moved upward or downward according to the height of the floor of the cargo container with which the unloading apparatus is used.

More specifically, support frame 352 includes four support legs 362, four lower frame members 364, and four upper frame members 366. Only three of the support legs, and two of the lower frame members are shown in the drawings. Legs 362 are substantially vertical, and as viewed from above, are located at the corners of a rectangle. Lower frame members 364 are connected to bottom ends of legs 362 and form a lower rectangle; and upper frame members 366 are connected to upper portions of the legs and form an upper rectangle, parallel to and directly above the lower rectangle formed by frame members 364. A set of wheels 370 is preferably connected to the lower frame members to help move frame 352 and apparatus 350.

Mandrel 354 is rotatably supported by and laterally extends between two of the upper members of frame 352; and to help connect a liner to the mandrel, this mandrel also may form an axially extending slot 372, similar to slot 212 of mandrel 204 and slot 312 of mandrel 304, that radially extends completely through the mandrel. Alternatively, mandrel 354 may be provided with a raised surface to grip a liner or conveyor sheet. A winch 374 is mounted on frame 352 and connected to mandrel 354 to rotate the mandrel. Any suitable engine or motor (not shown) may be used to operate winch 374; preferably, however, this engine or motor is one that can be operated by the power source on any vehicle used to carry container 100.

Hopper 360 is connected to and supported by frame 352, specifically one of the upper frame members 366, and the hopper is located directly below mandrel 354 to receive cargo from cargo container 100. More particularly, hopper 360 defines interior 360a, inlet 360b and outlet 360c. Inlet 360b is located at the top of the hopper and is in communication with the interior thereof to receive cargo from container 100 and to conduct that cargo into the hopper interior 360a, and outlet 360c, is located at the bottom of the hopper and is in communication with the interior thereof to discharge the cargo from the hopper. Preferably, as with hopper 336, the outlet 360c of hopper 360 is adapted to be connected to a rotary air lock, tube, or hose that may be used to conduct the cargo from the hopper to another location.

The various elements of frame 352 may be made of any suitable material, such as metal, and may be connected together in any acceptable way. Likewise, mandrel 354, hopper 360, and winch 374 may be connected to frame 352 in any suitable manner. Preferably, though, upper frame members 366 may be connected to legs 362 at any selected one of a multitude of positions along the height of those legs. With the embodiment of mechanism 350 shown in FIGS. 25 and 26, each of the legs 362 forms a multitude of bolt holes 376 vertically spaced apart along the upper portions of the leg, and frame members 366 are bolted to those legs 362.

To adjust the height of frame members 366—and thereby adjust the height of mandrel 354 and hopper 360—those frame members are unbolted from legs 362, raised or lowered to a new position along the height of those legs, and then re-bolted to the legs.

In operation, apparatus 350 is located adjacent cargo container 100, specifically, the back bottom edge thereof, the back edge of liner 104 or 134 is inserted through the axial slot of mandrel 354 or otherwise connected to or engaged by the mandrel, and the mandrel is rotated to pull the liner outward from the cargo container. The bulk cargo in the container 100 is pulled out therefrom with the liner and falls into hopper 360. This cargo may be collected in the hopper and then carried to a desired location, or the cargo may be conducted from the hopper via a delivery tube or rotary air lock connected to the hopper outlet.

Each of the unloading mechanisms 200, 300, and 350 may be provided with means, other than a single mandrel, to pull a liner from a cargo container. For instance, each of these unloading mechanisms may include a pair of adjacent rotatable mandrels; and in use, the leading edge of a liner may be inserted between these mandrels and the mandrels then rotated to pull the liner from a cargo container.

The unloading procedure described above is very well suited for unloading bulk cargoes. In addition, the procedure is also effective for unloading various pelletized granular products, individual cartons, bags, bales, loose garbage, drums, green salted raw hides, or almost any other commodity that can be loaded into a truck and discharged.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. An unloading system for use with a cargo container, said container having a cargo space defined by a container body with a floor between, a left side wall and a facing opposite right side wall, a ceiling facing the floor between the left side wall and right side wall, a front wall located between the side walls, floor and ceiling, at a front end of the container, and an opening at a rear end of the container formed by portions of the floor, the left side wall and the right side wall, and ceiling located at the rear of the container, the unloading system comprising:

a liner with length positioned on said floor, said liner having means to allow the length of the liner to expand;

an unloading apparatus comprising;

a frame support means;

pulling means supported by and extending across the support frame to engage the liner;

drive means supported by the frame and connected to the pulling means to drive the pulling means to pull the liner outward from the cargo container to unload cargo therefrom;

connecting means releasably connecting the pulling means to the frame support means, and adapted to connect the pulling means to the support frame at any one of a multitude of heights;

bulkhead means located forward of and adjacent the back opening, means connected to the container body and to the bulkhead means, suspending the bulkhead means inside the container body so that the bulkhead means does not depend upon the floor for support, the bulkhead means including a thin planar bulkhead with reinforcing bars secured thereto inside container body and said bars extending laterally across the bulkhead to engage the container body so that when a cargo is placed inside the container, the bars transfer a load of the cargo from the bulkhead to the container body; and when the liner is pulled outward, the cargo is unloaded the container through an opening in the bulkhead.

2. An unloading system according to claim 1, further comprising a hopper connected to the frame support means, beneath the pulling means, to receive the cargo unloaded from the cargo container.

3. An unloading system according to claim 1, wherein:

the frame support means includes a plurality of generally vertical support legs;

the connecting means includes
i) a plurality of support members, and
ii) means releasably connecting the support members to the support legs, and adapted to connect the support members to the support legs at any one of a multitude of heights; and the pulling means is connected to the support members.

4. An unloading system according to claim 1, wherein:

the frame support means includes a plurality of generally vertical support legs, each of the legs forming a plurality of bolt holes, vertically spaced apart along the leg;

the connecting means includes
i) a plurality of support members, and
ii) a plurality of bolts releasably connecting the support members to the support legs, each bolt engaging one of the support members, and secured in one of the bolt holes of one of the support legs; and the pulling means is connected to the support members.

5. An apparatus and system for unloading bulk cargo from a cargo container, said container having a cargo space defined by a container body with a floor between, a left side wall and a facing opposite right side wall, a ceiling facing the floor between the left side wall and right side wall, a front wall located between the side walls, floor and ceiling, at a front end of the container, and an opening at the rear end of the container formed by portions of the floor, the left side wall and the right side wall, and ceiling located at the rear of the container, the apparatus and system for unloading bulk cargo comprising:

a liner with length positioned on said floor, said liner having means to allow the length of the liner to expand, a flexible planar bulkhead of sheet-like construction located forward and adjacent the opening at the rear of the container between the ceiling, floor and side walls, said bulkhead being attached to bars which run between the opposite side walls of the container with straps attached to at least one of the bars, said straps also being attached to an upper portion of the container so that the bulkhead does not depend upon the floor for support, wherein the bulkhead has at a lower section a detachable portion, an unloading apparatus detachably suspended off the rear of the cargo container, said unloading apparatus having a mandrel laterally extending across the back opening with a left connection assembly at a left end of the mandrel, said left connection assembly detachably connected to the rear of the container and rotatably supporting the left end of the mandrel and a right connection assembly located at a right end of the mandrel, said right connection assembly being detachably connected to a rear portion of the container and rotatably supporting the right end of the mandrel, and a grip on the mandrel to connect the liner to the mandrel with a motor located adjacent the mandrel and engaging the mandrel to rotate the mandrel to wind the liner therearound, wherein winding the liner around the mandrel pulls the liner outward from the cargo container;

the apparatus and system cooperating such that when a bulk cargo is placed in the container on top of the liner, the bulkhead prevents the bulk cargo from spilling out of the rear opening; however, when the liner is attached to the mandrel and the detachable lower portion of the bulkhead is removed, the mandrel pulls the liner out of the container onto the mandrel and the bulk cargo placed in the liner passes through the opening in the bulkhead unloading the cargo from the container.

6. Unloading apparatus according to claim 5, wherein:

the left connection assembly includes
i) a left twist lock rotatably mounted on a frame, and
ii) a left handle connected to the left twist lock to pivot the left twist lock to facilitate inserting the left twist lock into, and locking the left twist lock in a left side of the cargo container; and the right connection assembly includes
i) a right twist lock rotatably mounted on the frame, and
ii) a right handle connection to the right twist lock to pivot the right twist lock to facilitate inserting the right twist lock into, and locking the right twist lock in, a right side of the cargo container.

7. An unloading apparatus according to claim 6, wherein:

the frame includes a main transverse beam having front and back sides, and adapted to extend laterally across the cargo container adjacent the back opening thereof;

the left and right twist locks are located on a front side of the transverse beam; and the left and right handles are located on a back side of the transverse beam.

8. An unloading apparatus according to claim wherein:

the left and right twist locks are supported for limited movement toward and away from the frame;

the left connection assembly further includes tightening means connected to the left twist lock to pull the left twist lock toward the frame and to connect the frame tightly to the left side of the cargo container; and the right connection assembly further includes tightening means connected to the right twist lock to pull the right twist lock toward the frame and to connect the frame tightly to the right side of the cargo container.

9. The system of claim 5 wherein the grip comprises a slot axially extending along and radially extending through the mandrel.

10. The system of claim 5 wherein the grip comprises a raised portion of the mandrel.

11. The system of claim 5 wherein the left-connection assembly includes a first hook to hook the unloading apparatus onto a left side of the container; and the right-connection assembly includes a second hook to hook the unloading apparatus onto a right side of the container.

12. The system of claim 11 wherein the first hook is adapted to hook onto a left back hinge of the cargo container, and the second hook is adapted to hook onto a right back hinge of the cargo container.

13. The system of claim 5 wherein the left-connecting mechanism includes a twist-lock mechanism to connect the left-connection assembly to a lower left corner of the container with an opening to receive the twist-lock mechanism and the right-connection assembly includes a twist-lock mechanism to connect the right twist-lock mechanism to a lower right-hand corner of the container with an opening to receive the same.

14. The system of claim 5 wherein an electric motor rotates the mandrel.

15. The system of claim 5 wherein the left-connecting mechanism includes a left-stabilizing bracket connected to the left-connection assembly and extending up therefrom, and the right-connection assembly includes a right-stabilizing bracket connected thereto and extending upward therefrom wherein both the right and left stabilizing brackets are adapted to abut against left and right sides, respectively, of the cargo container as the mandrel pulls the liner outward therefrom.

16. The system of claim 5 wherein the unloading apparatus includes a main transverse beam adapted to extend laterally across the cargo container adjacent the back opening thereof with a left stabilizing bracket connected to and extending upward from the transverse beam; and a right stabilizing bracket connected to and extending upward from the transverse beam; wherein the left and right stabilizing brackets are adapted to abut against left and right sides, respectively, of the cargo container as the mandrel pulls the liner outward therefrom.

17. The system of claim 5 wherein the system is adapted to unload at least 40,000 pounds of cargo from the cargo container in approximately 15 minutes.

18. The system of claim 5 further comprising a hopper located adjacent the mandrel to receive the cargo unloaded from the cargo container wherein the hopper defines an interior, an inlet located at a top of the hopper and in communication with the interior thereof for receiving the cargo, and an outlet located at a bottom of the hopper and in communication with the interior thereof for discharging the cargo from the hopper.

19. The system of claim 18 further including a discharge tube connected to the outlet of the hopper to conduct the cargo therefrom.

20. The system of claim 5, wherein the cargo is selected from a group of following products pelletized products, grains, such as malt, wheat, hops, coffee, etc., individual cartons, bags, bails, loose garbage, drums, and green salted raw hides.

* * * * *